United States Patent Office 3,441,740
Patented Apr. 29, 1969

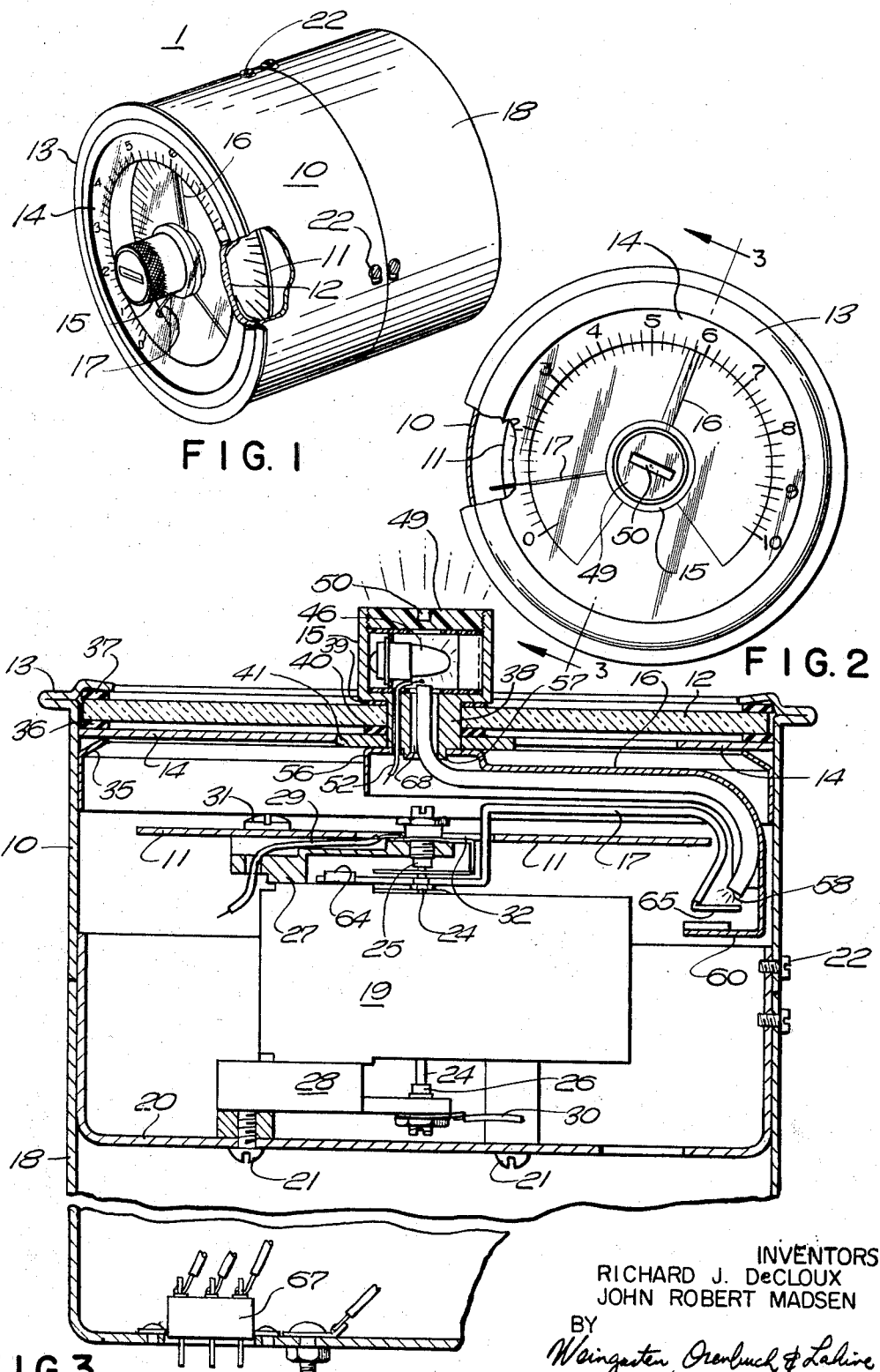

3,441,740
INDICATING METER RELAY WITH PHOTOELECTRIC MEANS FOR SENSING THE OVERLAPPING OF INDICATING POINTER OVER SET POINTER
Richard J. DeCloux, Manchester, and John Robert Madsen, Concord, N.H., assignors to Beede Electrical Instrument Co., Inc., Penacook, N.H., a corporation of New Hampshire
Filed Sept. 12, 1966, Ser. No. 578,756
Int. Cl. G01d 5/34; H01j 5/16; G08b 21/00
U.S. Cl. 250—231                     8 Claims The present invention relates in general to electrical control apparatus and more particularly to indicating instrument relays of the photoelectric, non-contact type.

Most indicating instruments include an indicating pointer associated with a scale and provide a continuous indication of the value of some variable. It is often desired to actuate some external system as, for example, an alarm, or to automatically control some system function whenever the variable being monitored and displayed on the instrument face either rises or falls to some predetermined value. The device known as the meter relay is currently in widespread use for this purpose.

Generally, in operation of the meter relay, a reference point is chosen on the instrument scale and a set pointer located in the instrument is manually positioned at that scale location, the latter being referred to as the setpoint. When the indicating pointer reaches the set-point, a signal is generated which causes a relay to actuate and perform a predetermined function. The techniques by which passage of the indicating pointer through the setpoint is sensed by an electrical relay circuit has been the subject of considerable prior design effort and is the primary area to which this invention is directed.

Since it is a customary requirement that the meter provide uninterrupted visible indication of the magnitude of the variable being measured even after the reference point has been reached and passed, the means for sensing the position of the indicating pointer at the set-point must operate without making contact with the pointer. Two basic types of non-contacting sensors are used in meter relays; one employs inductive coils which respond to magnetic field changes resulting from motion of the pointer, while the other uses photosensitive elements to detect interruption of a light beam by pointer motion through the set-point. This invention utilizes the latter approach in a simplified design which is both inexpensive and reliable and offers the added feature of failsafe operation.

Examination of the art reveals that prior photoelectric meter relays employed various combinations of elaborate gear trains, prisms, lenses and other related complicated and bulky equipment to achieve the desired sensitivity with useful reliability. For example, to prevent erroneous or ambiguous operation, the effects of ambient light variations on the photocells must be minimized. To achieve this, the light beam and photosensitive detector geometries had to be carefully controlled, most commonly through the use of lenses. Generally, these design considerations have led to placing the light source and the photocells well within the instrument case and behind an opaque front dial. Various methods have been used to provide a narrow beam of light to the photocells, such as placing the light source and the photocells in one opaque envelope with a small communicating channel between them. Another method is to place the photocells themselves in an opaque envelope with only a narrow slit allowing external light to illuminate their photosensitive surfaces. This requires light from the source bulb to be sharply focused onto the slit so that when such light is interrupted no uncontrolled light remains to illuminate the photocell.

A number of disadvantages are inherent in such designs. The necessity of keeping the source bulb and the photosensitive elements well within the instrument made them somewhat inaccessible so that bulb failure were not easily detectable and once detected the bulb could not be easily replaced without going behind the panel or even partially disassembling the meter. When lenses or prisms are used for focusing purposes, construction of such an instrument is expensive and cumbersome because of the number of parts involved and the necessity of alignment of such optical apparatus to provide the desired beam of light at the desired position. Also with the light source and optical apparatus located behind the front dial and the indicating pointer in front of it, a second rotating arm was often necessary to carry the light interrupting vane, which arm moved coincidentally with the indicating pointer. Also many light interrupting vanes were designed to cover a large sector so that the light would be interrupted for a substantial period of time thus continuously activating the control function while allowing the indicating pointer to proceed across the scale. The addition of a second rotating pointer or a large sector vane necessarily put an increased load on the pivots of the meter movement which pivots are likely to be quite delicate, especially so in very sensitive instruments. In addition to the stress placed upon the pivots, the added mass of these parts tends to cause sluggish response by the meter movement itself.

The present invention remedies all of the above disadvantages in a compact, simple and reliable design with the added features of fail-safe operation and ready accessibility to the light bulb for replacement purposes. This invention is applicable to any movable pointer type indicating instrument and its use is not restricted to any particular shape of instrument or type of meter movement. For purposes of illustration, this specification will be directed to a circular dial, 250° meter movement. Since the ratio of scale length to instrument panel area is larger for a circular 250° meter than for most other types, it offers greater accuracy, sensitivity and resolution in the same space, readily lending itself to applications where accuracy is required of a meter relay.

Broadly speaking, the invention comprises a set pointer controlled by a hollow knob which is rotatable about the meter movement axis and which protrudes through the center of the transparent meter face in the front of the meter and contains a light bulb and a translucent cover through which the light of the bulb may be seen. Behind the meter face is an indicating dial. The set pointer extends beyond the periphery of the dial and bends under it carrying photosensitive elements commonly referred to as photocells, on the outer end under the dial. The photocells are illuminated by light from the bulb in the control knob by means of a fiber optic, commonly called a light pipe. The light pipe is carried by the set pointer and provides for continuous illumination of the photocells. The indicating pointer, which operates independently of the set pointer, is also bent under the dial and has attached to its outer end a small opaque vane of at least sufficient size to cover completely the light sensitive surface of one photocell. When the meter relay is in a normal unactuated condition, the cells are illuminated and act as small voltage sources. When light is interrupted by the vane, and their sensitive surfaces are darkened, they cease to generate an electrical potential. The photosensitive elements are included in a relay circuit which, in response to their voltage changes, performs a predetermined function.

If the light bulb should happen to fail while the meter is operating, that fact will be immediately visually apparent through the translucent cover of the hollow control knob. In addition to the visual indication, bulb failure will cause the relay to operate in the same manner as if the predetermined scale position had been reached and the light had been interrupted by the moving vane. This result may be obtained by simply allowing the darkening of the photocells to actuate the relay or by placing the light bulb in series with the relay circuit so that bulb failure acts as complete power failure. Since the relay is normally in "safe" condition, either method causes it to actuate and whatever the function the relay was intended to perform, whether alarm or control, it will then occur and there will be no danger of the meter reading going too high while the relay device is not fully operating. Although the meter relay of this invention will function with one photocell, if two or more are used they may be arranged in an electrical memory circuit (which circuit would also include a relay, a voltage source and suitable resistors) in such a way that one can ascertain whether the indicating pointer passes the set pointer on its way up or on its way down the scale. A relatively simple state-of-the-art logic or flip-flop circuit adequately serves this purpose. An additional feature is that the translucent cover of the adjusting knob is easily removable by operating personnel so that a defective bulb may be replaced within a matter of seconds after the bulb has failed.

The foregoing and other advantages and features of the present invention will become readily apparent from the following description when read in conjunction with the drawing in which:

FIG. 1 is a perspective view of a meter incorporating this invention;

FIG. 2 shows the front of the meter of FIG. 1;

FIG. 3 is a sectional view taken along line 3—3 in FIG. 2 with the indicating pointer aligned with the set pointer;

Figure 4:
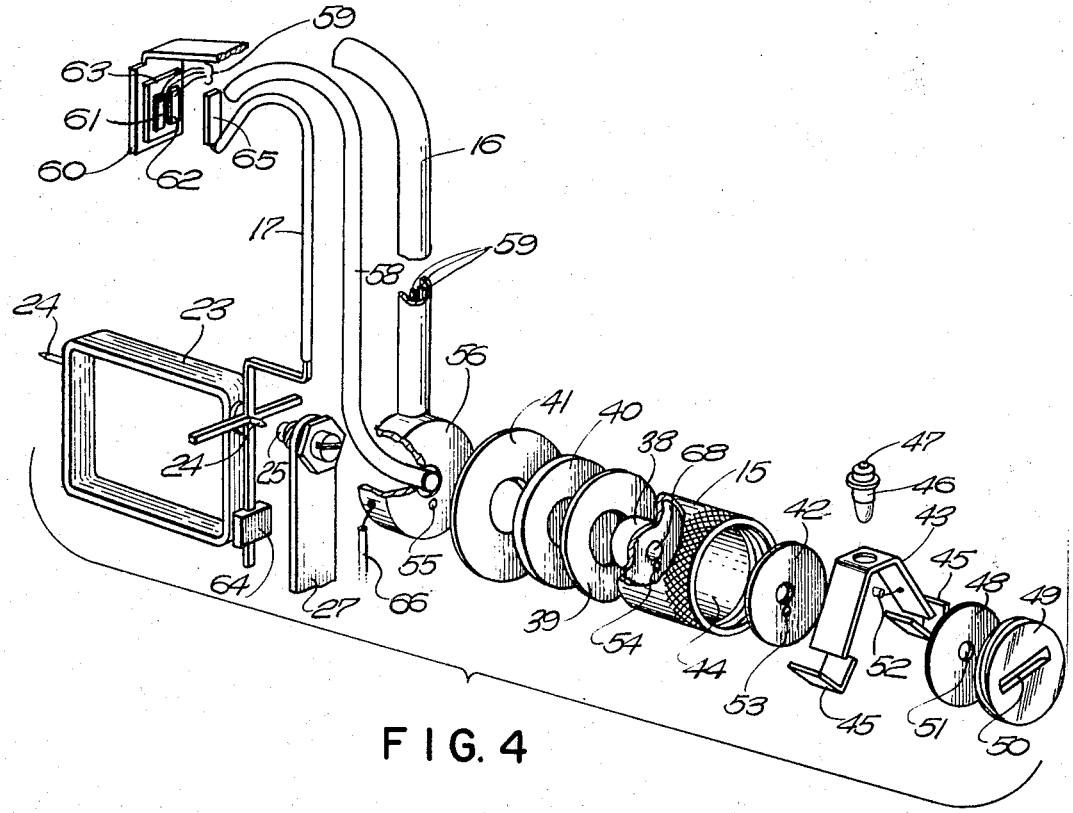
FIG. 4 is an exploded view of the indicating pointer and set pointer assembly of the invention.

Referring now to the drawing and more particularly to FIGS. 1 and 2 thereof, the entire meter assembly is indicated by the reference numeral 1. A portion of the front of cylindrical meter case 10, which houses the instrument, is cut away to show opaque rear dial 11 and transparent face 12 which may be glass or other suitable substance. Rim 13 acts as an enclosing and sealing ring for transparent face 12 and opaque annular front dial 14 which is mounted behind the transparent face and extends radially inwardly from the periphery of the meter. Control knob 15 extends through face 12 and controls set pointer 16 and indicating pointer 17 are mounted behind front dial 14 and in front of rear dial 11, but rotate in different planes so that they may travel independently up or down the full length of the scale without mutual contact. Cylindrical case 18 located at the rear of the meter is designed to enclose terminal boards and electrical circuitry used in conjunction with the meter relay. Rear dial 11 is aligned with front dial 14 and extends rearwardly therefrom so that when the viewer is directly in front of the meter face, the markings on dial 11 appear to be radially inward extensions of the markings on dial 14 so that there is no reading error due to parallax which would be likely with only a single scale.

Now turning to FIGS. 3 and 4, meter movement 19 may be any type of movement, but for purposes of illustration, it is shown as the well known and widely used D'Arsonval type, employing a variable current carrying coil moving through a magnetic field. This invention does not depend upon the type of movement used, but upon the fact that an indicating pointer moves across a scale in response to a variable value to be displayed. Movement 19 is mounted in rear housing 20 by means of mounting bolts 21. Housing 20 is mounted in cylindrical case 10 by means of screws 22. Indicating pointer 17 is fixed to the front of coil 23 (shown in FIG. 4) and pivots 24 are mounted on the front and rear of coil 23. Front pivot 24 is pivotally mounted in bearing 25 and rear pivot 24 is pivotally mounted in bearing 26 to allow nearly frictionless rotation of coil 23. Coil 23 is shown as an offset coil in order to allow it and pointer 17 to rotate through a full 250° arc. Bearings 25 and 26 are supported by mountings 27 and 28, respectively. Electrical signals from the variable being measured are applied to coil 23 by means of wires 29 and 30, such signals causing coil 23 to rotate pointer 17 to the proper indicating position on dials 11 and 14. Dial 11 is attached to mounting 27 by means of screws 31. Dial 11 has cut out area 32 through which pointer 17 extends for free rotation.

Retaining ring 35 seals transparent face 12 in place by forcing the assembly of front dial 14, gasket 36, face 12 and gasket 37 against rim 13. Control knob 15 which is in front of face 12 and has a partially knurled outer surface to facilitate turning, is pivotally mounted in face 12 with boss 38 extending therethrough, and is sealed therein by Teflon bearing washer 39 on the outside surface of face 12 and by a rubber washer 40 on the inside surface which is kept snugly in place by retaining ring 41 which is staked onto boss 38. Since ambient light is likely to cause erroneous or ambiguous operation, as explained above, inner rim of dial 14 is designed to overlap the outer rim of dial 11 so that the two dials cooperate to act as baffles in keeping ambient light from entering the interior of meter 1. Thus the dual dial configuration performs the light shielding function in addition to providing indicating scales and an anti-parallax device.

Figures 5, 6, 7, 8:
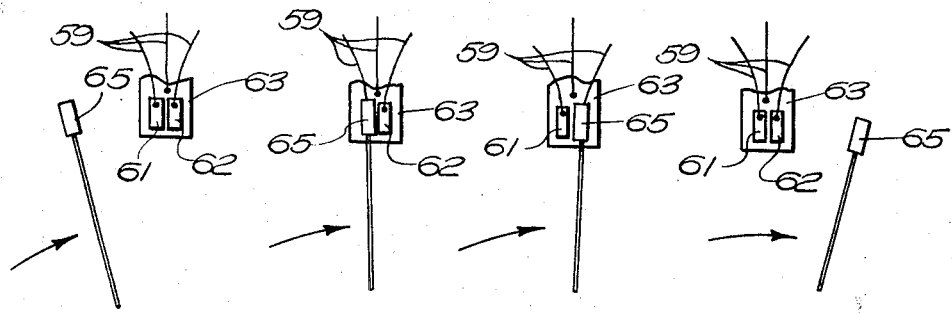
FIG. 5 shows the indicating pointer in motion approaching the photosensitive elements located at the set-point.
FIG. 6 shows the vane on the indicating pointer obscuring one of the photosensitive elements on the set pointer.
FIG. 7 shows the vane obscuring the second photosensitive element.
FIG. 8 shows the indicating pointer moving beyond the position of the set-point.

The details of the set pointer assembly are best understood by referring to FIG. 4. Control knob 15 contains: electrically insulating washer 42; electrically conducting spring mounting bracket 43 which is insulated from conducting interior surface 44 of knob 15 by means of insulators 45; light bulb 46, base contact point 47 of which is maintained in contact with surface 44 by bracket 43; electrically insulating opaque washer 48; and translucent cover 49. Bulb 46 may be a standard number 718 lamp which has indefinite life at rated voltage. Cover 49 is screwed into knob 15 and is easily removed for replacing bulb 46 by non-technical personnel by using a screwdriver or a coin in slot 50. Washer 48 is designed to shield the control knob cavity from external light of sufficient intensity to energize the relay circuit and cause erroneous operation when bulb 46 is off. Cover 49 acts as a pilot light when illuminated by bulb 46 through hole 51 in washer 48, such hole being sufficiently small so that the light shielding function of washer 48 is not defeated. Wire 52 is a lead for energizing bulb 46 and is electrically connected to bracket 43, extends through hole 53 in washer 42, hole 54 in boss 38 and hole 55 in set pointer base 56, thence to an appropriate electrical source connection in cylindrical base 18. Boss 38 extends through face 12 and washers 39, 40 and 41 are fitted thereon as described above. Boss 38 has a shallow necking 57 (shown in FIG. 3) on which is force fitted and staked set pointer base 56. Set pointer 16, an extension of base 56, is rounded to form a channel which opens toward the rear of the meter and which contains light pipe 58 and wires 59. Light pipe 58 is a standard fiber optic member made of Lucite or other suitable substance which has the ability to transmit light around corners without substantial attenuation, its inner end extending through channel 68 in boss 38 so as to receive light from bulb 46 for transmission through its length and out of its outer end. Set pointer 16 is flat at its outer end 60 where separate and distinct photosensitive elements 61 and 62 are mounted on a common conductive backing 63 which in turn is insulated from set pointer 16. Wires 59 are electrically connected to each photosensitive element 61 and 62 and backing 63, respectively. Weight 64 is mounted on pointer 17 diametrically across the pivotal axis from the extended pointer arm to act as a counterbalance. Opaque vane 65, which is at least of such size as to completely cover one photosensitive element as shown in FIGS. 6 and 7, is mounted on the outer end of indicating pointer 17. As pointed out below in the description of the operation of the invention, vane 65 may be large enough to cover both photocells as it swings up or downscale without adversely affecting the relay operation. It should be pointed out here that photosensitive elements 61 and 62 and vane 65 are at all times beneath opaque dials 11 and 14 so that they are shielded from ambient light. Wire 66 is electrically connected to base 56, which is electrically conductive, and provides a ground connection for bulb 46, the conducting path being through base 56, boss 38 to surface 44 to bulb contact point 47.

In operation, meter 1 is connected to appropriate power sources, an electrical relay circuit and the variable to be measured. Energizing meter 1 also energizes bulb 46, its light being visible through translucent cover 49. At the same time light pipe 58 transmits light from bulb 46 to elements 61 and 62 thereby placing the relay circuit (not shown), of which elements 61 and 62 are a part, in its normal operating state, that is, the relay is placed in "safe" condition. Control knob 15 is then turned to position set pointer 16 at the scale reading at which an alarm or some control device is desired to be actuated. As the value of the variable being measured by meter 1 increases, indicating pointer 17 goes farther up the scale until it reaches the set-point. The movement of indicating pointer 17 is shown in FIGS. 5 through 8 as it approaches and passes the set-point. The electronic relay circuit (not shown), of which elements 61 and 62 are a part, operates so that when in normal operating condition a relay is in one or two states, either closed or open, whichever state puts it in a "safe" condition, so that any power failure or other abnormality will cause it to actuate and perform its intended function. When element 61 is darkened by vane 65 as shown in FIG. 6, substantially nothing happens, the state of the relay remaining normal. However, when element 62 is darkened after element 61, as shown in FIG. 7, the relay circuit, which may be a flip-flop or other suitable logic circuit, changes and causes a change of state of the relay, actuating the control device with which the meter is associated. When the indicating pointer continues up the scale and both element 61 and 62 are again illuminated, as shown in FIG. 8, no appreciable change occurs in the relay circuit so the relay remains in its actuated position. When the indicating pointer comes back down the scale, similar electrical action occurs so that the relay does not revert to normal until element 61 is darkened following the darkening of element 62, which causes the relay circuit to again change its state. Then as vane 65 continues down the scale allowing both photosensitive elements to be fully illuminated, the relay remains in its normal safe condition. It should be noted that it is not necessary that only one photocell be darkened at a time, but only that they be darkened in one order when the indicating pointer proceeds upscale, and in the reverse order when proceeding downscale. Thus all control functions are accomplished and the relay circuit is returned to its normal operating condition without having any effect upon the meter movement and its visible indications.

The fail-safe features of this invention is readily apparent when attention is directed to the fact that when photosensitive elements 61 and 62 are both illuminated before indicating pointer 17 has gone far enough to reach the set-point, the relay circuit is in its normal quiescent or safe state. But if both elements 61 and 62 are darkened, as by bulb failure, the relay would actuate in the same manner as if the meter reading had reached the set-point and would perform the same function, normally some type of safety function. An alternative fail-safe embodiment would be to put source bulb 46 in series with the power to the relay circuit so that failure of the bulb not only darkens the photocells but causes power failure as to the whole circuit which also causes the relay to drop into its off-safe condition. A quick visual check of the meter face will indicate whether the meter relay has actuated because of high reading or because of bulb failure, since translucent cover 49 acts as a pilot light and glows when bulb 46 is illuminated and the meter relay is properly functioning.

Although the above exposition describes a 250° meter movement, it could easily be adapted, as mentioned earlier, to any other arc as well as for an edge reading meter which has an essentially curved rather than the circular planar scale of a panel meter. Furthermore, a useful device could be made with one, two or more photosensitive elements. All external connections may be made through rear housing 20 by having a suitable terminal board mounted within that housing, or they may be made through case 18 which may be adapted to hold a terminal board, as indicated by reference numeral 67 in FIG. 3, plus the relay circuit. circuit. The embodiment shown in FIGS. 1 and 3 with case 18 acting as a dust cover and a housing for terminal board 67 and the relay circuit, provides for convenient servicing or changing of the whole relay circuit if a different type of action is desired.

It is evident that many other modifications will occur to those skilled in the art which are within the scope of the inventon. Consequently, the invention is to be construed as limited only by the spirit and scope of the appended claims.

What is claimed is:

1. An indicating instrument relay, comprising:
   an indicating meter movement having a fixed scale and an indicating pointer pivotally mounted on the front thereof and rotatable about a predetermined axis, said indicating pointer cooperating with said scale to present a visual indication of the value of a variable being measured;
   a pivotally mounted set pointer extending radially outwardly from and rotatable about said axis, said set pointer cooperating with said scale to provide a visual indication of the position thereof;
   photosensitive means for providing a predetermined signal in respsonse to a change in illumination, said photosensitive means being fixedly attached to the outer end of said set pointer;
   a light source positioned o said axis;
   means attached to and coextensive with said set pointer for directing light from said light source in a path to said photosensitive means; and
   a vane fixedly attached to the outer end of said indicating pointer and arranged for movement in an arcuate path which intersects the path of light directed to said photosensitive means.

2. An indicating instrument relay in accordance with claim 1, wherein:
   said means for conducting light from said light source to said photosensitive means is a light pipe disposed substantially in the region between said set pointer and the plane of movement of said indicating pointer.

3. An indicating instrument relay in accordance with claim 2, and further comprising:
   a transparent face disposed forward of said scale; and
   a control knob protruding through and rotatably mounted in said transparent face, said knob being fixedly attached to said set pointer for control of the rotation thereof.

4. An indicating instrument relay in accordance with claim 3 wherein:
   said control knob is hollow and contains said light source; and
   further including a translucent cover for said control knob;
   whereby activation of said light source provides illumination of said translucent cover visible from the front of said instrument.

5. An indicating instrument relay in accordance with claim 4 wherein:
said translucent cover is removably mounted in said control knob to facilitate servicing said light source.

6. An indicating instrument relay in accordance with claim 4, wherein:
said scale comprises an annular front dial disposed rearwardly of said transparent face and a coaxial circular rear dial spaced rearwardly of said front dial, the outer diameter of said circular rear dial being greater than the inner diameter of said front dial, both dials having scale markings in radial registration;
said set pointer and said indicating pointer extend between said front and rear dials with the outer ends of said pointers turned rearwardly of said rear dial; and
said vane and said photosensitive means are positioned rearwardly of said rear dial;
whereby the scale markings on said dials cooperate to permit parallax free readings, and said dials further coact to shiled said photosensitive means from ambient light.

7. An indicating instrument relay in accordance with claim 6, wherein:
said outer end of said set pointer is turned radially inward with said photosensitive means positioned substantially behind said rear dial;
said light pipe is turned rearwardly and inwardly for directing light onto said photosensitive means;
said outer end of said indicating pointer is turned rearwardly and inwardly, whereby the path of said vane passes between said light pipe and said photosensitive means.

8. An indicating instrument relay in accordance with claim 1, wherein:
said photosensitive means comprises a pair of adjacent photoconductive semiconductors disposed on a common conductive backing and arranged whereby said vane in upscale movement interrupts the light directed thereto in one order, and in downscale movement interrupts the light directed thereto in reverse order.

References Cited

UNITED STATES PATENTS

| | | | |
|---|---|---|---|
| 2,113,947 | 4/1938 | Pottish | 250—231 |
| 2,659,563 | 11/1953 | Saxe | 250—231 X |
| 3,171,034 | 2/1965 | Tomasulo et al. | 250—237 |
| 3,290,593 | 12/1966 | Crowdes | 250—231 X |
| 3,320,604 | 5/1967 | Baer | 340—266 |
| 3,390,274 | 6/1968 | Hunt | 250—231 |

JAMES W. LAWRENCE, *Primary Examiner.*

V. LAFRANCHI, *Assistant Examiner.*

U.S. Cl. X.R.

250—227; 317—127; 340—266